United States Patent [19]

Kurita

[11] Patent Number: 5,679,284
[45] Date of Patent: Oct. 21, 1997

[54] LIQUID CRYSTAL POLYESTER RESIN COMPOSITION

[75] Inventor: Hayato Kurita, Shizuoka, Japan

[73] Assignee: Polyplastics Co., Ltd., Osaka, Japan

[21] Appl. No.: 661,712

[22] Filed: Jun. 11, 1996

Related U.S. Application Data

[63] Continuation of Ser. No. 360,034, Dec. 20, 1994, abandoned.

[30] Foreign Application Priority Data

Dec. 28, 1993 [JP] Japan ................... 5-336953

[51] Int. Cl.$^6$ ........................... C09K 19/52; C09K 19/00
[52] U.S. Cl. ........................... 252/299.01; 428/1
[58] Field of Search ................ 252/299.01; 428/1

[56] References Cited

U.S. PATENT DOCUMENTS

| | | | |
|---|---|---|---|
| 2,437,046 | 3/1948 | Rothrock, Jr. et al. | |
| 4,244,859 | 1/1981 | Sugie et al. | 524/450 |
| 4,408,022 | 10/1983 | Cincotta et al. | 525/444 |
| 4,451,611 | 5/1984 | Cincotta et al. | 525/51 |
| 4,489,190 | 12/1984 | Froix | 524/539 |
| 4,778,858 | 10/1988 | Ginnings | 525/425 |
| 4,792,587 | 12/1988 | Kanoe et al. | 525/131 |
| 4,843,140 | 6/1989 | Poll et al. | 528/176 |
| 4,888,127 | 12/1989 | Wada et al. | 252/299.5 |
| 5,296,542 | 3/1994 | Layton et al. | 524/600 |
| 5,358,661 | 10/1994 | Mazaki et al. | 252/299.01 |
| 5,389,286 | 2/1995 | Tendolkar et al. | 252/299.01 |
| 5,397,502 | 3/1995 | Waggoner et al. | 252/299.01 |
| 5,427,712 | 6/1995 | Nakamura et al. | 252/299.01 |
| 5,514,739 | 5/1996 | Aketa et al. | 524/108 |

FOREIGN PATENT DOCUMENTS 0 180 960  5/1986  European Pat. Off. .

*Primary Examiner*—C. H. Kelly
*Attorney, Agent, or Firm*—Burns, Doane, Swecker & Mathis, L.L.P.

[57] ABSTRACT

An improved synthetic resin composition is provided that consists essentially of 100 parts by weight of a resin component composed of in excess of 50 up to 99 parts by weight of a liquid crystal polyester resin (A) capable of forming an anisotropic melt phase, and 1 up to less than 50 parts by weight of a polyalkylene terephthalate resin (B), to which has been added 0.001 to 5 parts by weight of a phosphorus ester (C) (e.g., a pentaerythritol phosphite). The presence of the phosphorus ester in the specifically defined polymer blend has been found to greatly impede the formation of deleterious mold deposits, and to make possible the formation of quality molded articles on an expeditious basis having good mechanical properties.

12 Claims, No Drawings

LIQUID CRYSTAL POLYESTER RESIN COMPOSITION

This application is a continuation of application Ser. No. 08/360,034, filed Dec. 20, 1994 now abandoned.

FIELD OF THE INVENTION

The present invention relates to a resin composition that is particularly suited for use in molding applications. More specifically, the present invention relates to a liquid crystal polyester resin composition which is improved in its ability to inhibit mold deposit formation in the course of molding, and is sufficiently thermally and chemically stable so as to preclude the evolution of appreciable decomposition gas during melt processing. It further exhibits excellent mechanical properties when molded.

BACKGROUND OF THE INVENTION

A liquid crystal polyester resin (LCP) capable of forming an anisotropic melt phase is a thermoplastic resin having many desirable characteristics such as high strength, high rigidity, high thermal resistance, and easy moldability, but there are also commercial disadvantages such that the mold shrinkage and mechanical properties tend to vary depending upon the molecular chain orientation in the molded product and the direction in which the measurement is conducted, and the purchase price tends to be high. Under these circumstances, it has been attempted to blend another resin into LCP. Particularly, polyalkylene terephthalate resins typified by polyethylene terephthalate and polybutylene terephthalate are recognized to be possible resins for blending with the LCP.

However, even though no problem is posed when an LCP or a polyalkylene terephthalate is utilized alone, injection molded articles produced merely by blending LCP with polyalkylene terephthalate have tended to pose problems in that a mold deposit is formed as the result of an interaction between the two resin components.

SUMMARY OF THE INVENTION

After intensive investigations made for the purpose of solving the above-described problem by developing a material which does not form any appreciable mold deposit in the course of molding, the inventor has found that when a small amount of a phosphorous ester is added to a blend as specified herein of a liquid crystal polyester and a polyalkylene terephthalate in accordance with the concept of the present invention, the formation of mold deposits can be remarkably inhibited while the characteristic advantageous properties of the liquid crystal polyester can be well retained. The present invention has been completed on the basis of this finding.

An improved liquid crystal polyester resin composition suitable for use in molding applications is provided that consists essentially of 100 parts by weight of a resin component wherein in excess of 50 up to 99 (e.g., 60 to 80) parts by weight are a liquid crystal polyester resin (A) capable of forming an anisotropic melt phase and 1 up to less than 50 (e.g., 20 to 40) pans by weight are a polyalkylene terephthalate resin (B), and 0.001 to 5 parts by weight of a phosphorus ester (C).

In preferred embodiments the polyalkylene terephthalate is polyethylene terephthalate or a copolymer thereof, and the phosphorus ester is a pentaerythritol phosphite. Also, in preferred embodiments the improved liquid crystal resin composition of the present invention additionally includes (D) 0.001 to 5 parts by weight of a hindered phenol and/or (E) a particulate inorganic filler.

DETAILED DESCRIPTION

The liquid crystal polyester (A) used in the present invention is a melt-processable polyester in which the polymer molecular chains become regularly disposed in a parallel configuration in a molten state. Such an arrangement of polymer chains in the melt is often called the "liquid crystal state" or "nematic phase of a liquid crystal substance". The molecules of such liquid crystal polyester commonly are long, narrow, and flat. There is a high rigidity along the longitudinal axis of the molecular chains and there commonly are two or more, coaxial or parallel chain-extending bonds.

The properties of the anisotropic molten phase can be confirmed by the use of a standard polarization test method with the aid of crossed polarizers. In particular, the anisotropic molten phase can be confirmed by observing a molten sample placed on a Leitz hot stage of a Leitz polarization microscope at a 40X magnification while present in a nitrogen atmosphere. When the molten polymer of the present invention is examined between the crossed polarizers, the polarized light passes through it even in the static state so as to exhibit optical anisotropy.

The liquid crystal polyester suitable for use in the present invention commonly is substantially insoluble in an ordinary solvent and, therefor it is unsuitable for conventional solution processing. However, as described, such resin is readily capable of undergoing melt processing.

The liquid crystal polyester to be used in the present invention is preferably an aromatic polyester. Also preferred is a liquid crystal aromatic polyester that additionally includes recurring polyester amide units in the same molecular chain.

The particularly preferred liquid crystal aromatic polyesters, including the liquid crystal aromatic polyesteramides, are derived from at least one compound selected from the group consisting of aromatic hydroxyl carboxylic acids, aromatic hydroxyl amines, and aromatic diamines.

More specifically, there may be mentioned:

(1) polyesters that contain a major concentration of units derived from one, two or more aromatic hydroxycarboxylic acids, and derivatives thereof, (2) polyesters consisting essentially of units derived from:
  (a) one, two or more aromatic hydroxycarboxylic acids, and derivatives thereof,
  (b) one, two or more aromatic dicarboxylic acids, alicyclic dicarboxylic acids, and derivatives thereof, and
  (c) at least one, two or more aromatic diols, alicyclic diols, aliphatic diols, and derivatives thereof, (3) polyesteramides consisting essentially of units derived from:
  (a) one, two or more aromatic hydroxycarboxylic acids, and derivatives thereof,
  (b) one, two or more aromatic hydroxyamines, aromatic diamines, and derivatives thereof, and
  (c) one, two or more aromatic dicarboxylic acids, alicyclic dicarboxylic acids, and derivatives thereof, (4) polyesteramides consisting essentially of units derived from:
  (a) one, two or more aromatic hydroxycarboxylic acids, and derivatives thereof, (b) one, two or more aromatic hydroxyamines, aromatic diamines, and derivatives thereof, and (c) one, two or more aromatic dicarboxylic acids, alicyclic dicarboxylic acids, and derivatives thereof, and (d) at least one, two or more aromatic diols, alicyclic diols, aliphatic diols, and derivatives thereof.

Furthermore, a molecular weight modifier may be used if required together with the above-mentioned components.

Preferred examples of monomers that can be utilized during the production of the liquid crystal polyesters selected for use according to the present invention are naphthalene compounds, such as 2,6-naphthalene dicarboxylic acid, 2,6-dihydroxynaphthalene, 1,4-dihydroxynaphthalene, and 6-hydroxy-2-naphthoic acid; biphenyl compounds, such as 4,4'-diphenyl dicarboxylic acid and 4,4'-dihydroxybiphenyl; benzene compounds substituted at the para-position and nuclear-substituted benzene compounds such as p-hydroxy benzoic acid, terephthalic acid, hydroquinone, p-aminophenol and p-phenylene diamine (wherein substituents such as chlorine, bromine, methyl, ethyl, phenyl and 1-phenylethyl are optionally present on the aromatic rings); as well as benzene compounds substituted at the meta-position such as isophthalic acid, resorcinol, etc.

Preferred liquid crystal polyesters are formed from naphthalene compounds, such as 2,6-naphthalene dicarboxylic acid, 2,6-dihydroxynaphthalene, 1,4-dihydroxynaphthalene, and 6-hydroxy-2-naphthoic acid; biphenyl compounds such as 4,4'-diphenyl dicarboxylic acid and 4,4'-dihydroxybiphenyl; and compounds expressed by the following general Formulae (I), (II) or (III):

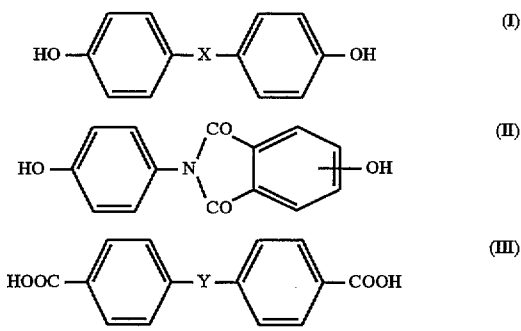

wherein, X is a radical selected from alkylene ($C_1$ to $C_4$), alkylidene, —O—, —SO—, —SO$_2$—, —S— and —CO—, Y is a radical selected from —(CH$_2$)$_n$— where n is 1 to 4, and —O(CH$_2$)$_n$O— where n is 1 to 4.

Furthermore, the liquid crystal polyesters used according to the present invention may include units derived from polyalkylene terephthalates wherein at least some recurring units are included in the molecular chains that do not contribute to the formation of an anisotropic melt phase. In such instances, the alkyl groups may contain from 2 to 4 carbon atoms.

Among the above-mentioned components, those containing one, two or more of compounds selected from naphthalene compounds, biphenyl compounds and benzene compounds linked at the para-positions are particularly preferred. Additionally, among the benzene compounds linked at the p-position, p-hydroxy benzoic acid, methyl hydroquinone, and 1-phenyl ethyl hydroquinone are particularly preferred.

Specific examples of polyesters forming an anisotropic melt phase that are preferred for use in accordance with the present invention are described in Japanese Published Application No. Sho 63-36633.

The liquid crystal polyester suitable for use in the present invention commonly has a weight-average molecular weight of approximately 2,000 to 200,000, preferably about 10,000 to 50,000, and most preferably approximately about 20,000 to 25,000. In a preferred embodiment a liquid crystal polyester that includes recurring amide units commonly has a weight-average molecular weight of approximately 5,000 to 50,000, preferably approximately 10,000 to 30,000, and most preferably approximately 15,000 to 27,000. The molecular weight can be determined by gel permeation chromatography or other standard determination methods not involving solution formation, such as a method in which the terminal groups of a compression-molded fill are determined by infrared spectroscopy. The molecular weight can be determined also by a light scattering method after dissolving a specified concentration of the polymer in a solvent such as pentafluorophenol.

The above-mentioned liquid crystal polyesters (i.e., aromatic polyesters and polyesteramides) generally exhibit a logarithmic viscosity (I.V.) of at least approximately 2.0 dl/g (e.g., approximately 2.0 to 10.0 dl/g), when dissolved at 60° C. in pentafluorophenol in a concentration of 0.1 percent by weight.

The polyalkylene terephthalate resin (B) used in the present invention is a saturated alkylene terephthalate polymer or a copolymer obtained by polycondensing terephthalic acid with an alkylenediol commonly containing 2 to 4 carbon atoms as the main components. Preferred comonomer components include isophthalic acid, cyclohexanedimethanol, bisphenol A, 2,2-bis(β-hydroxyethoxyphenyl)propane, and halogen-substituted derivatives and ester-forming derivatives thereof. The resin (B) may be also a polyalkylene terephthalate resin having a branched structure formed by using a small amount of a polyfunctional monomer such as trimethylolpropane, pentaerythritol, trimellitic acid, pyromellitic acid, trimesic acid or an ester-forming derivative thereof. The degree of polymerization of the resin (B) is not particularly limited so long as it is capable of undergoing melt processing to form a molded article. Particularly preferred examples of the resin (B) include polyalkylene terephthalate homopolymers and copolymers such as polybutylene terephthalate, polybutylene terephthalate/isophthalate copolymer, polyethylene terephthalate, polyethylene terephthalate/isophthalate copolymer, polybutylene/cyclohexanedimethylene terephthalate copolymer, polycyclohexanedimethanol terephthalate, and polycyclohexanedimethanol terephthalate isophthalate copolymer. The polyalkylene terephthalates may be a mixture of two or more of such resins. From the standpoint of ease of melt blending with the liquid crystal polyester (A), the particularly preferred polyalkylene terephthalate is polyethylene terephthalate and copolymers thereof.

The phosphorus ester (C) to be used in the improved molding composition of the present invention has been found to exhibit the ability to inhibit the formation of mold deposits during the course of the molding of a blend as specified herein prepared from the molten polyalkylene terephthalate (B) and the molten liquid crystal polyester (A). Although the applicable scientific mechanism for the highly beneficial influence of the phosphorus ester in this specific composition is considered to be complex and incapable of simple explanation, it is conceivable that the decomposition of the blended polyalkylene terephthalate caused by the end groups of the liquid crystal polyester is inhibited by the component (C). It is observed that the formation of mold deposits in a molding step commonly is only slight when either the liquid crystal polyester or the polyalkylene terephthalate is singly molded in the absence of the component (C).

Although the phosphorus ester (C) to be used in the present invention is not particularly limited, examples thereof include triphenyl phosphite, tris-(nonylphenyl) phosphite, diisodecylpentaerythritol diphosphite, di(2,6-di-t-butyl-4-methylphenyl)pentaerythritol diphosphite, and di(2,4-di-t-butylphenyl)pentaerythritol diphosphite. Particularly preferred are the pentaerythritol phosphites. These phosphorus esters can be used also in mixtures of two or more.

The relative amounts of the resin components of the present invention per 100 parts by weight are as follows. In the resin components comprising the liquid crystal polyester resin (A) and the polyalkylene terephthalate resin (B), the liquid crystal polyester resin (A) is provided in an amount of in excess of 50 up to 99 (e.g., 60 to 80) parts by weight and the polyalkylene terephthalate resin (B) is provided in an amount of 1 up to less than 50 (e.g., 20 to 40) parts by weight.

Further, 0.001 to 5 (e.g., 0.05 to 0.2) parts by weight of the phosphorus ester (C) are incorporated into 100 parts by weight of the resin component. When the amount of the component (C) is below 0.001 part by weight, the effect of inhibiting the formation of mold deposits is scarcely obtained and, on the contrary, when it much exceeds 5 parts by weight, the mechanical strength may be lowered.

In a preferred embodiment of the present invention 0.001 to 5 (e.g., 0.05 to 0.2) parts by weight of a hindered phenol compound further are added as component (D) to 100 parts by weight of the resin components. Although no significant effect can be obtained when the hindered phenol compound (D) is used singly, the effect of inhibiting the formation of mold deposits is further improved when it is used in combination with the phosphorus ester (C).

A particulate inorganic filler (E) selected from among various fibrous, powdery, granular and platy fillers can be incorporated into the resin composition of the present invention. The exact filler selected will be influenced by the intended use of the resulting molded article.

Representative fibrous fillers include inorganic fibrous substances, such as glass, asbestos, silica, silica/alumina, alumina, zirconia, boron nitride, silicon nitride, boron and potassium titanate fibers, and fibrous metals, such as stainless steel, aluminum, titanium, copper and brass.

Representative powdery and granular fillers include carbon black, graphite, silicates such as silica, quartz powder, glass beads, milled glass fibers, glass balloons, glass powder, calcium silicate, aluminum silicate, kaolin, talc, clay, diatomaceous earth and wollastonite, metal oxides such as iron oxide, titanium oxide, zinc oxide, antimony trioxide and alumina, metal carbonates such as calcium carbonate and magnesium carbonate, metal sulfates such as calcium sulfate and barium sulfate, ferrite, silicon carbide, silicon nitride, boron nitride, and various metal powders.

Representative platy fillers include mica, glass flake and various metal foils.

These inorganic fillers can be used either singly or in combination of two or more.

The inorganic filler used in the present invention can be subjected to a surface treatment depending upon the desired properties. Examples of such surface treatments include the addition to the surfaces of functional compounds, such as epoxies, isocyanates, titanates, and silanes. Preferably the inorganic filler has been treated with a compound other than an amino compound, such as with an epoxy or a polyamide compound.

The filler may be used after being subjected to a surface treatment or it may be added together with a surface treatment agent during the formation of the composition of the present invention.

The amount of the inorganic filler (E) is preferably 1 to 50 (e.g., 10 to 50) percent by weight based upon the weight of the whole composition.

The liquid crystal polyester resin composition of the present invention further may contain other supplementary thermoplastic resins so long as they do not unduly interfere with the surprisingly beneficial results made possible by the present invention. The thermoplastic resins to be used for this purpose are not particularly limited. Examples of them include polyolefins, such as polyethylene and polypropylene, polyacetals (homo- or copolymers), polystyrene, polyamide, polycarbonate, ABS, polyphenylene oxide, polyphenylene sulfide, and fluororesin. These thermoplastic resins are usable also in the form of a mixture of two or more of them.

The resin composition of the present invention may further contain known substances usually incorporated into thermoplastic and thermosetting resins, such as stabilizers, e.g., antioxidants and ultraviolet absorbers, antistatic agents, flame retardants, colorants, e.g., dyes and pigments, and lubricants depending upon the contemplated end use for the composition.

The liquid crystal polyester resin composition of the present invention can be prepared by any method with any apparatus usually employed for the preparation of a melt-blended synthetic resin composition. Namely, the necessary resin components are mixed together when molten and the resultant mixture is kneaded on a single-screw or double-screw extruder and is extruded to form pellets for use during molding. It is possible to mix part of the necessary components as a master batch before molding, or to pulverize part or the whole of the liquid crystal polyester resin followed by mixing with other components prior to extruding to form a substantially uniform blend. When fibers are added during the course of a melt extrusion step, the breakage of the fibrous filler is advantageously reduced.

The starting pellets obtained as described above can be molded by any well-known method for the melt processing of thermoplastic resins to form molded articles, such as injection molding, extrusion molding, vacuum molding or compression molding. Injection molding is preferred for use in conjunction with the improved liquid crystal resin composition of the present invention.

The specifically defined liquid crystal polyester resin composition of the present invention exhibits excellent characteristics that are found to be made possible by the addition of the phosphorus ester, such as a surprising reduction in the amount of the mold deposit that is formed, and the ability to carry out injection molding of quality molded articles at a high rate of productivity. A significant reduction in labor costs to periodically clean the mold is facilitated. Good mechanical properties in the resulting molded articles also are exhibited.

The invention is illustrated by the following working Examples; however, the invention is not limited to the specific details set forth in the Examples.

EXAMPLE 1

The liquid crystal polyester (A), polyethylene terephthalate (B), and phosphorus ester (C) were mixed in the proportions as specified in Table 1, kneaded with the use of a standard extruder, and were pelletized to form molding pellets. The pellets were molded into test pieces according to the ASTM standard on an injection molding machine at a cylinder temperature of 290° C., and the properties of the test pieces were evaluated.

After a 1000-shot injection molding run using a boat-shaped mold at a mold temperature of 60° C., the formation of mold deposit was observed with the naked eye, and the extent of deposition was evaluated by the criteria:

○—Scarcely any deposition,
Δ—An intermediate level of deposition, and
X—Serious deposition.

EXAMPLE 2

The test pieces were prepared by molding and were evaluated in the same manner as that of Example 1 with the exception that a different liquid crystal polyester was utilized as set forth hereafter.

EXAMPLE 3

The test pieces were prepared by molding and were evaluated in the same manner as that of Example 1 with the exception that glass fibers were incorporated as inorganic filler (E).

EXAMPLE 4

The test pieces were prepared by molding and were evaluated in the same manner as that of Example 3 with the exception that a different phosphorus ester was utilized as set forth hereafter.

Comparative Example 1

The test pieces were prepared by molding and were evaluated in the same manner as that of Example 1 with the exception that no phosphorus ester was utilized.

EXAMPLE 5

The test pieces were prepared by molding and were evaluated in the same manner as that of Example 1 with the exception that both of the phosphorus ester (C) and the hindered phenol compound (D) as set forth hereafter were utilized.

Comparative Example 4

The test pieces were prepared by molding and were evaluated in the same manner as that of Example 1 except that the phosphorus ester (C) was replaced by hindered phenol compound (D) as set forth hereafter.

The results of the evaluation are summarized in Table 1.

The liquid crystal polyester resins used in these Examples had the following constituent units:

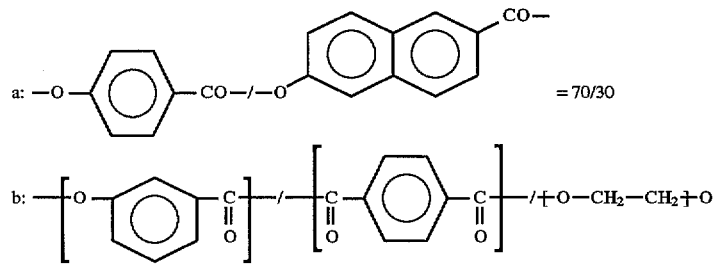

Comparative Example 2

The test pieces were prepared by molding and were evaluated in the same manner as that of Example 2 with the exception that no phosphorus ester was utilized.

Comparative Example 3

The test pieces were prepared by molding and were evaluated in the same manner as that of Example 3 with the exception that no phosphorus ester was utilized.

The phosphorus esters (c and d) used in the Examples were as follows:

c: di(2,6-di-t-butyl-4-methylphenyl)pentaerythritol diphosphite, and d: di(2,4-di-t-butylphenyl)pentaerythritol diphosphite.

The hindered phenol compound used in the Examples was tetrakis [methylene-3(3,5-di-t-butyl-4-hydroxy-phenyl) propionate]methane.

TABLE 1

| | | (A) Liquid crystal polyester (parts by weight) | (B) Polyethylene terephthalate (parts by weight) | (C) Phosphorus ester (parts by weight) | (D) Hindered phenol (parts by weight) | (E) Inorganic filler (parts by weight) | Tensile strength (kgf./cm.$^2$) | Mold deposit |
|---|---|---|---|---|---|---|---|---|
| Ex. | 1 | a 70 | 30 | c 0.1 | — | — | 1550 | ○ |
| | 2 | b 70 | 30 | c 0.1 | — | — | 1300 | ○ |
| | 3 | a 70 | 30 | c 0.1 | — | 40 | 1550 | ○ |
| | 4 | a 70 | 30 | d 0.1 | — | 40 | 1550 | ○ |
| | 5 | a 70 | 30 | c 0.1 | 0.1 | — | 1550 | ○ |
| Comp. | 1 | a 70 | 30 | — | — | — | 1600 | X |
| Ex. | 2 | b 70 | 30 | — | — | — | 1200 | X |
| | 3 | a 70 | 30 | — | — | 40 | 1600 | X |
| | 4 | a 70 | 30 | — | 0.1 | — | 1600 | Δ |

I claim:

1. An improved liquid crystal polyester resin composition suitable for use in molding applications consisting essentially of 100 parts by weight of a resin component comprising a physical blend of (A) and (B) wherein in excess of 50 up to 99 parts by weight are a liquid crystal polyester resin (A) capable of forming an anisotropic melt phase and 1 up to less than 50 parts by weight are a polyalkylene terephthalate resin (B), and 0.001 to 5 parts by weight of a phosphorus ester (C), wherein the presence of said phosphorus ester (C) in said composition is capable of inhibiting the formation of deleterious mold deposits during the injection molding of said composition that customarily are associated with the combined presence of a liquid crystal polyester resin and a polyalkylene terephthalate resin in a resin in a physical blend during injection molding.

2. An improved liquid crystal polyester resin composition suitable for use in molding applications according to claim 1 wherein said polyalkylene terephthalate resin (B) contains 2 to 4 carbon atoms in the recurring alkylene units.

3. An improved liquid crystal polyester resin composition suitable for use in molding applications according to claim 1 wherein said polyalkylene terephalate resin (B) is selected from the group consisting of polyethylene terephthalate, polybutylene terephthalate, and mixtures thereof.

4. An improved liquid crystal polyester resin composition suitable for use in molding applications according to claim 1 wherein said polyalkylene terephthalate resin (B) is polyethylene terephthalate or a copolymer thereof.

5. An improved liquid crystal polyester resin composition suitable for use in molding applications according to claim 1 wherein said phosphorus ester (C) is a pentaerythritol phosphite.

6. An improved liquid crystal polyester resin composition suitable for use in molding applications according to claim 1 that additionally includes approximately 0.001 to 5 parts by weight of a hindered phenol.

7. An improved liquid crystal polyester resin composition suitable for use in molding applications according to claim 1 that additionally includes approximately 0.05 to 0.2 part by weight of a hindered phenol.

8. An improved liquid crystal polyester resin composition suitable for use in molding applications according to claim 1 that additionally contains a particulate inorganic filler.

9. An improved liquid crystal polyester resin composition suitable for use in molding applications according to claim 1 that additionally contains a particulate inorganic filler in a concentration of approximately 1 to 50 percent by weight based upon the total weight of the composition.

10. An improved liquid crystal polyester resin composition suitable for use in molding applications according to claim 1 that additionally contains a particulate inorganic filler in a concentration of approximately 10 to 50 percent by weight based upon the total weight of the composition.

11. An improved liquid crystal polyester resin composition suitable for use in molding applications according to claim 1 that includes approximately 60 to 80 parts by weight of said liquid crystal polyester resin (A), and approximately 20 to 40 parts by weight of said polyalkylene terephalate resin (B).

12. An improved liquid crystal polyester resin composition suitable for use in molding applications according to claim 1 that includes approximately 0.5 to 0.2 parts by weight of said phosphorus ester (C).

* * * * *